T. L. GREEN.
BISCUIT CUTTING MACHINE.
APPLICATION FILED FEB. 20, 1909.
1,180,030.
Patented Apr. 18, 1916.
9 SHEETS—SHEET 1.
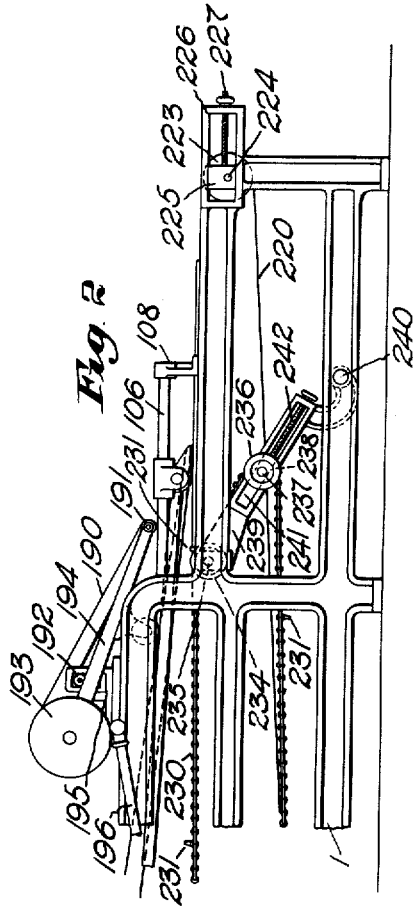
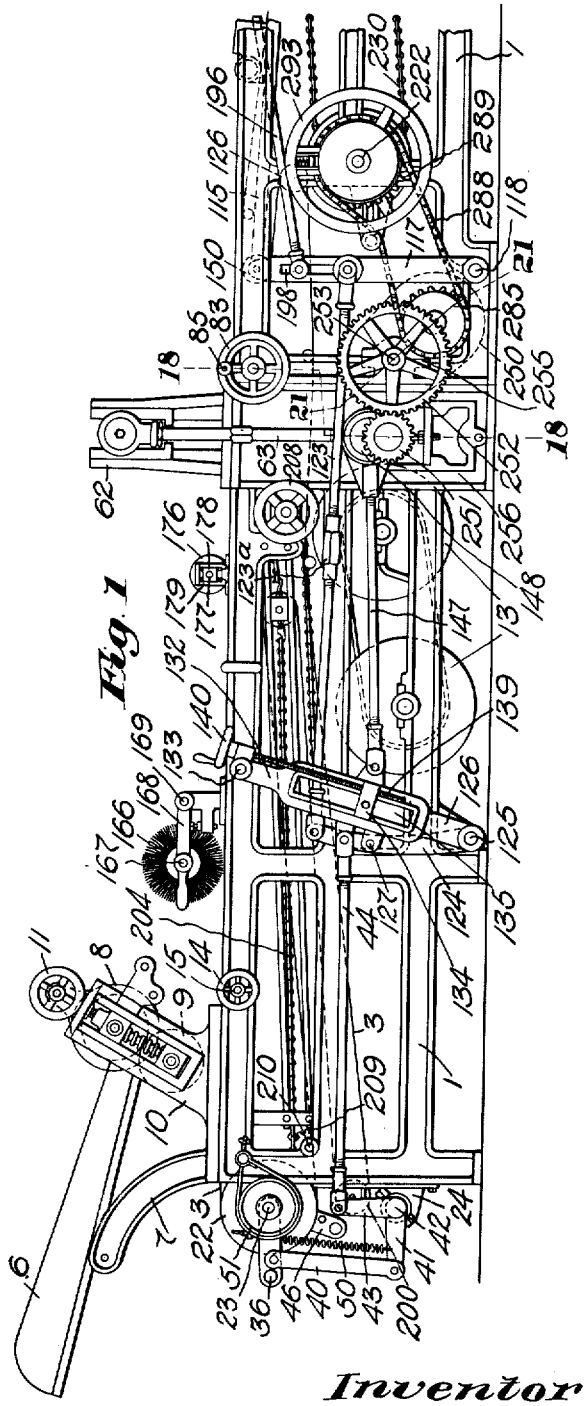
Witnesses:
Horace H. Crossman
Robert H. Kammla
Inventor:
Thomas L. Green
by Emery & Booth
Attys.

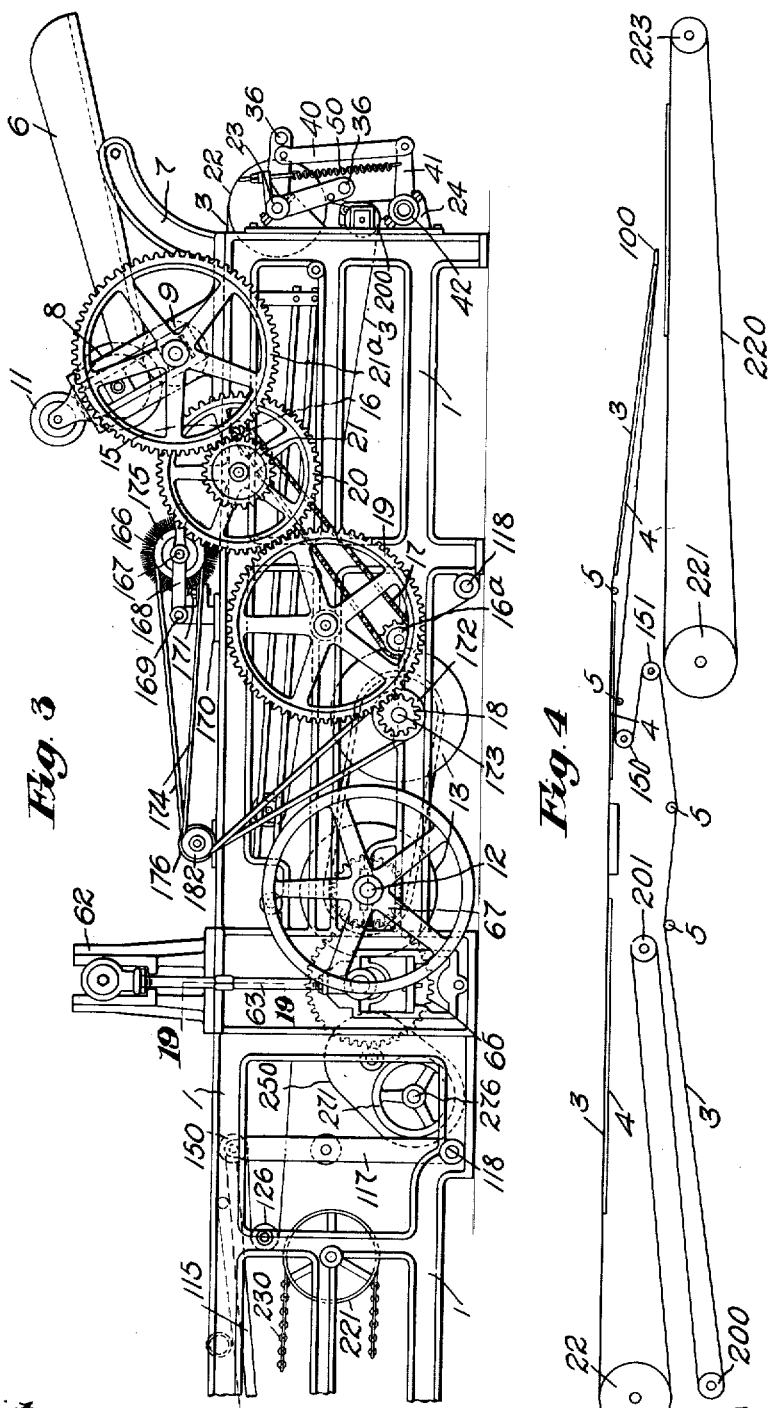

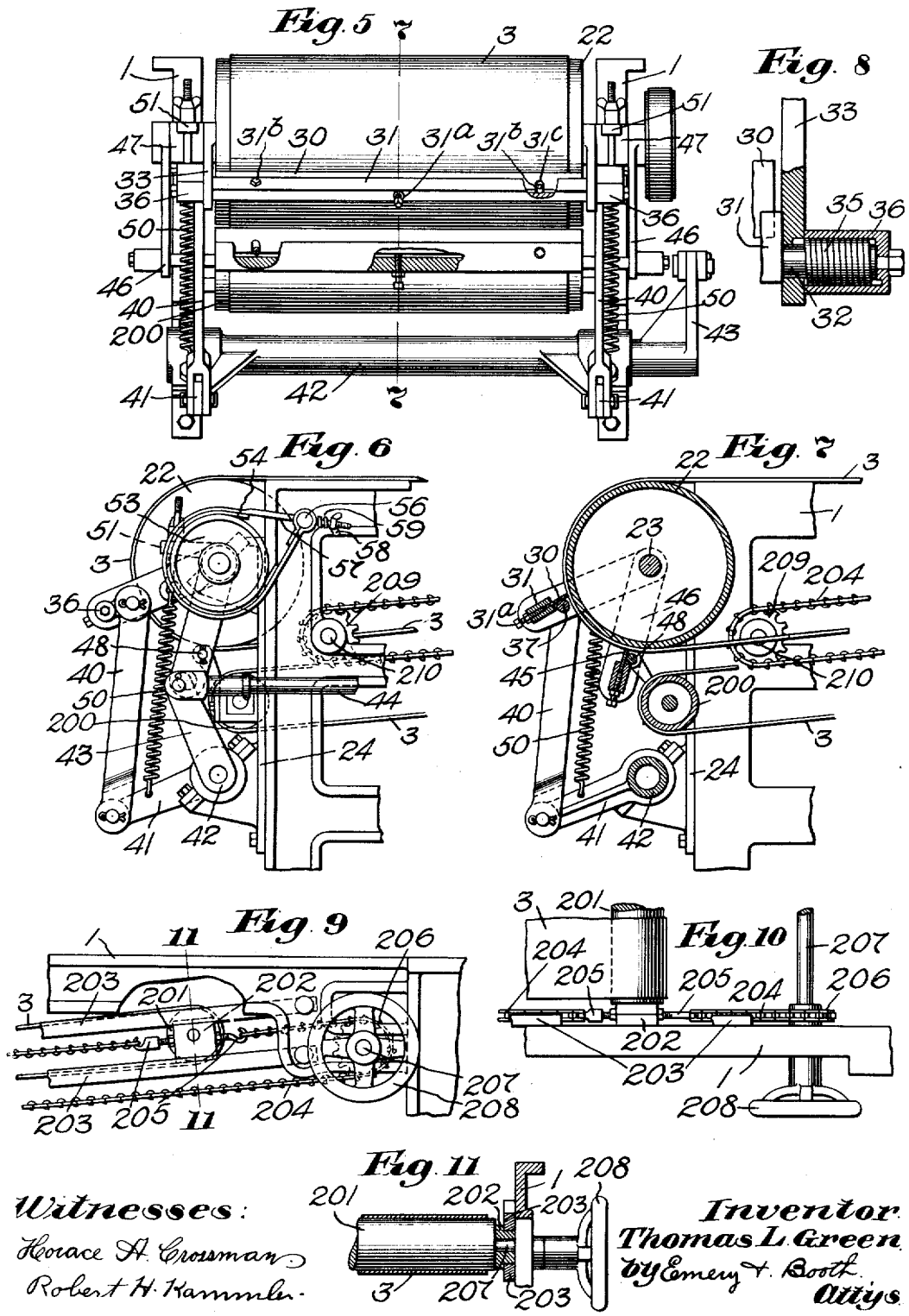

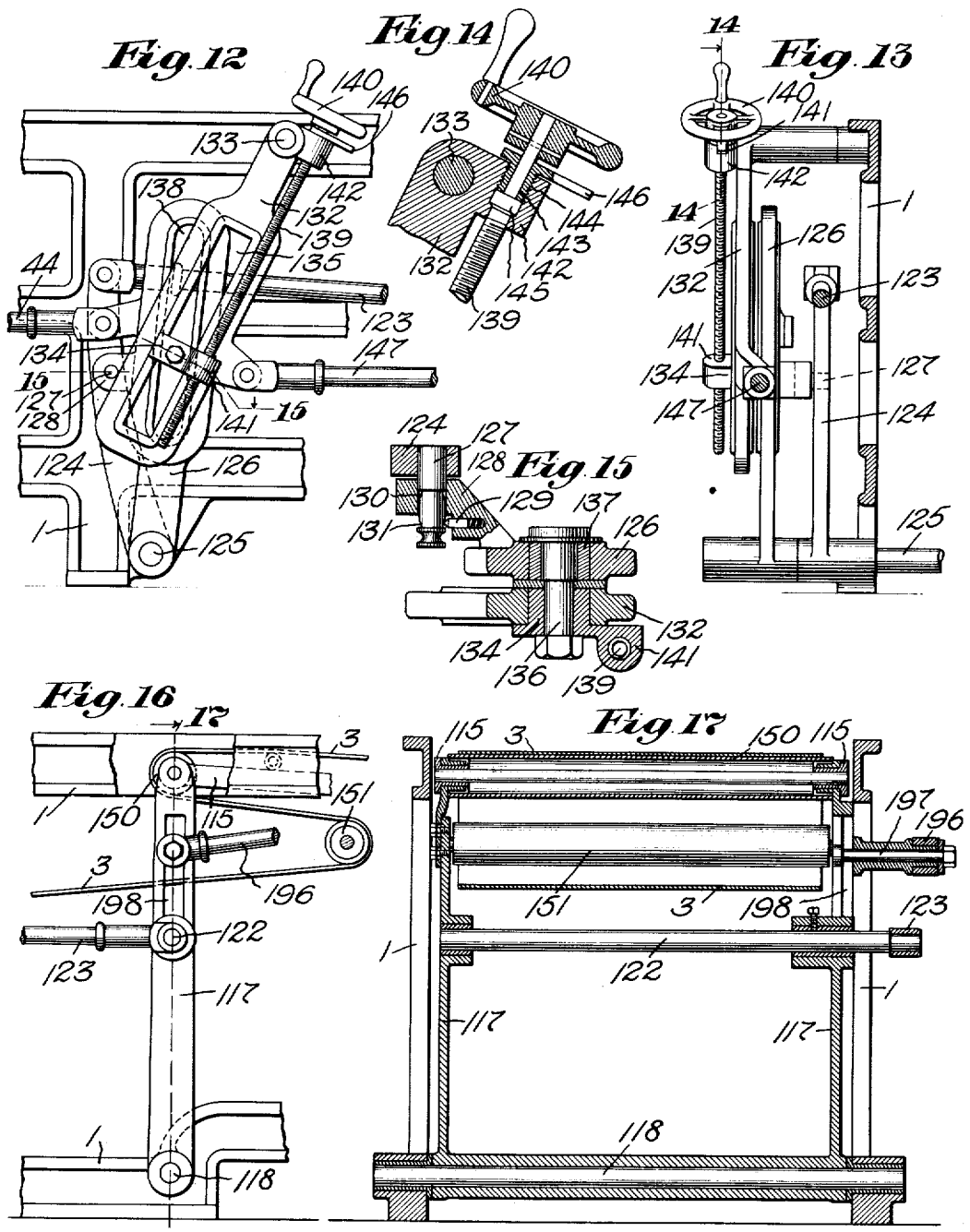

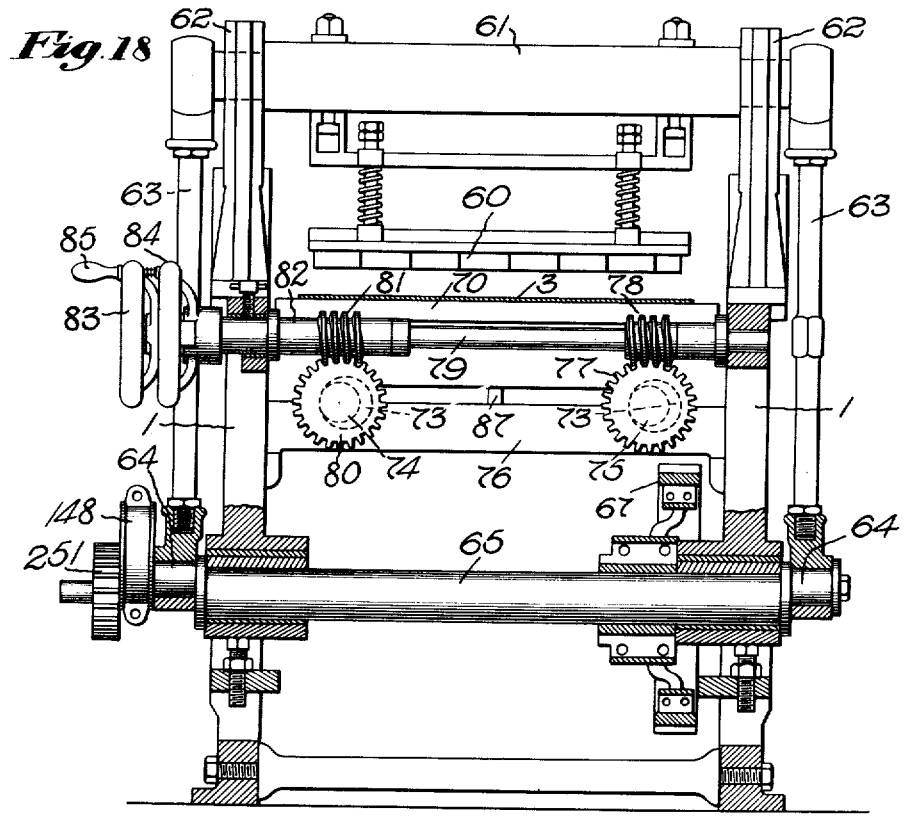

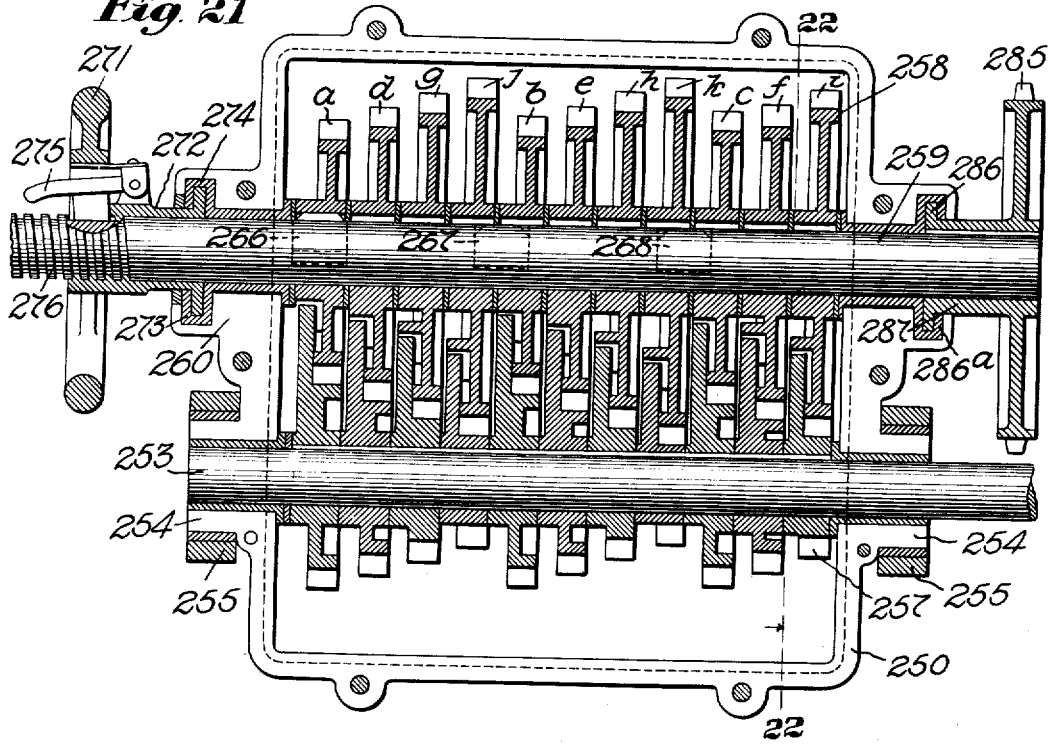
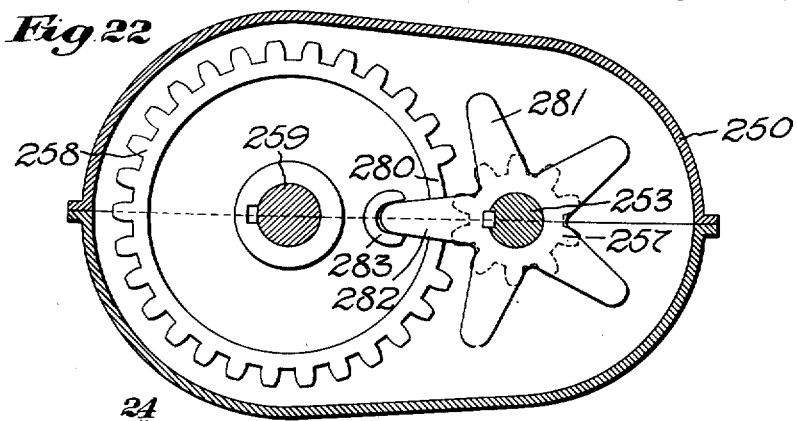
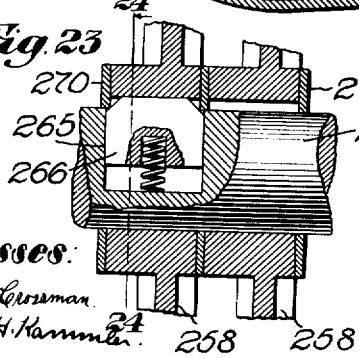
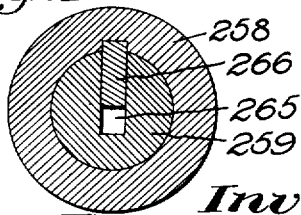

T. L. GREEN.
BISCUIT CUTTING MACHINE.
APPLICATION FILED FEB. 20, 1909.
1,180,030.
Patented Apr. 18, 1916.
9 SHEETS—SHEET 7.
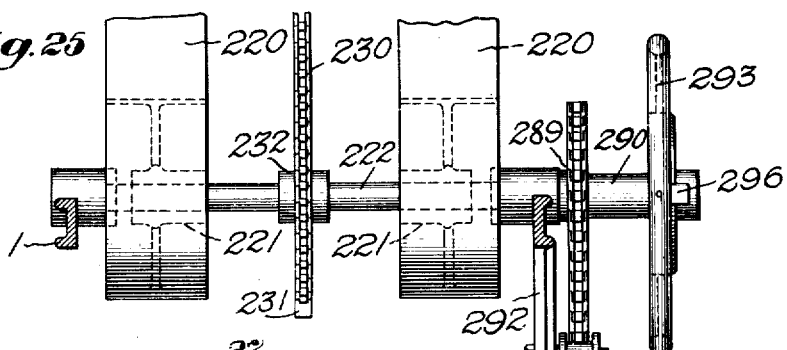
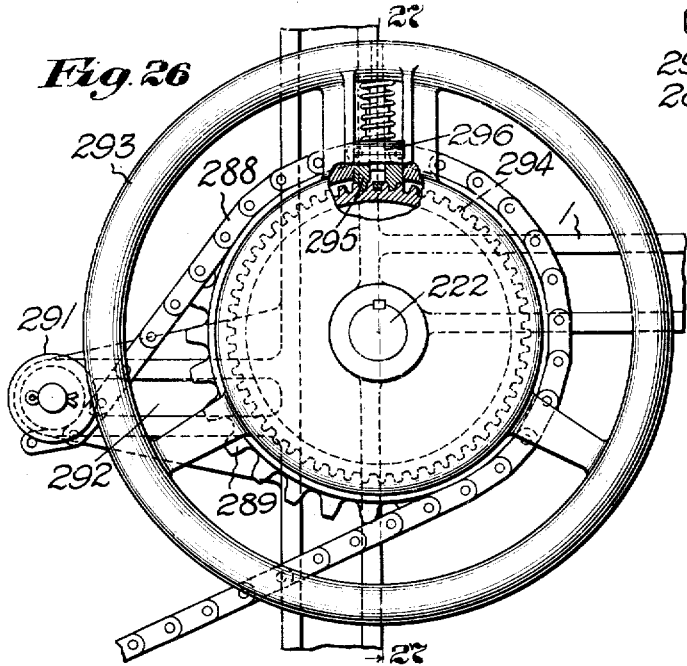
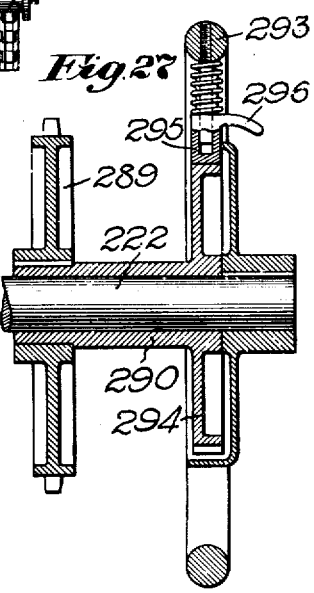
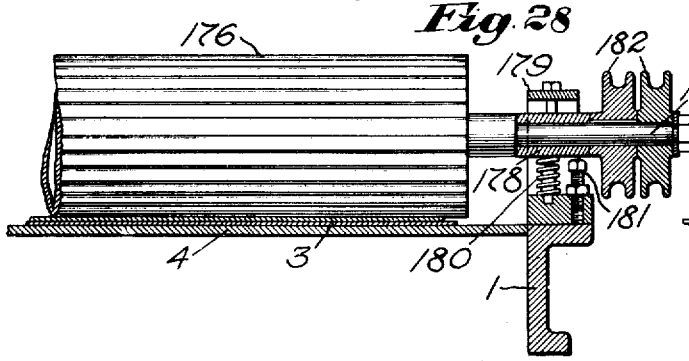
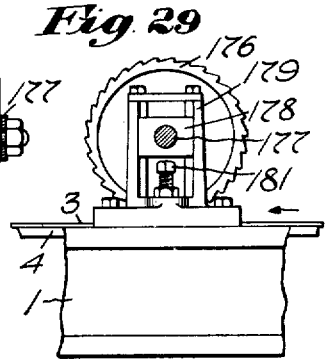
Witnesses:
Horace H. Crossman
Robert H. Kammler
Inventor:
Thomas L. Green
by Emery & Booth
Attys.

T. L. GREEN.
BISCUIT CUTTING MACHINE.
APPLICATION FILED FEB. 20, 1909.
1,180,030.
Patented Apr. 18, 1916.
9 SHEETS—SHEET 8.
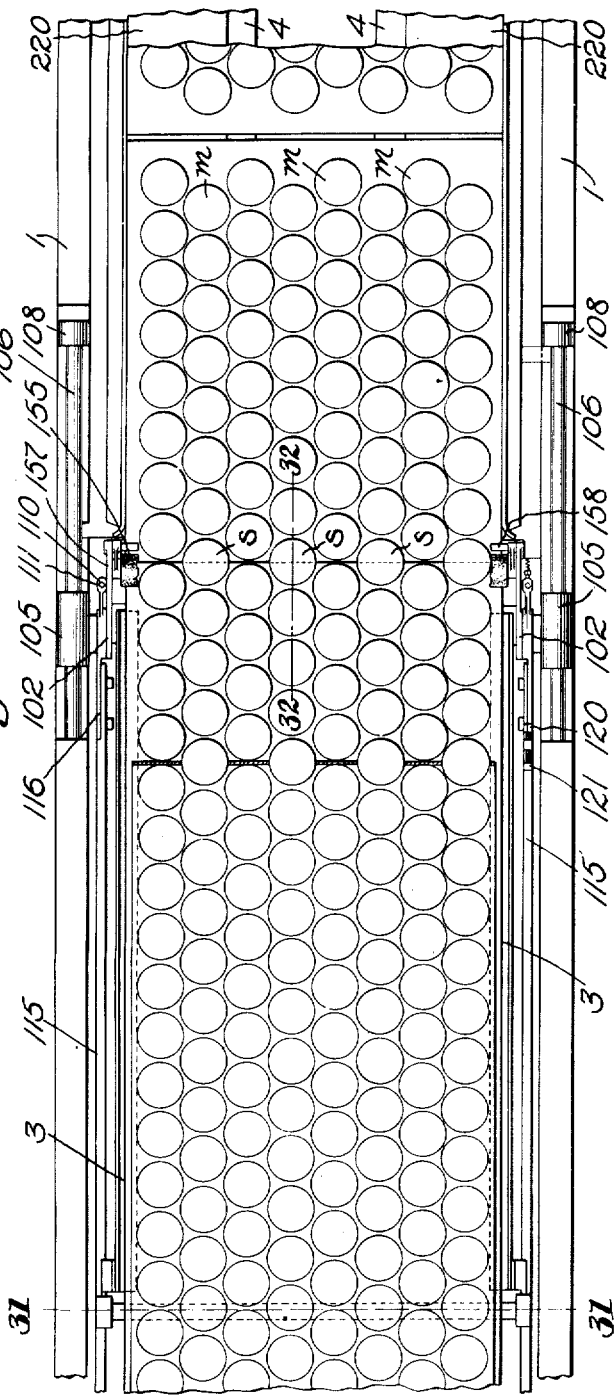
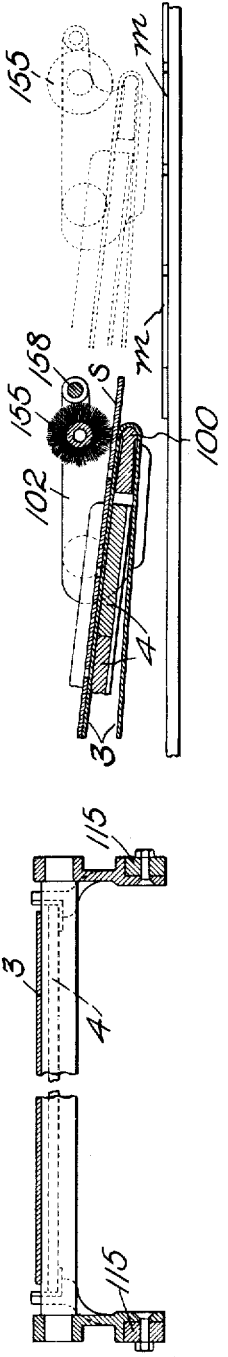
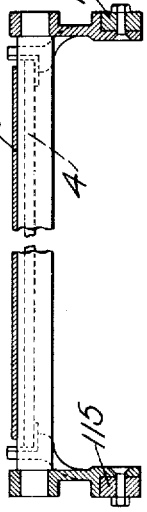
Witnesses:
Horace H. Crossman
Robert H. Kammler
Inventor:
Thomas L. Green
by Emery & Booth
Attys.

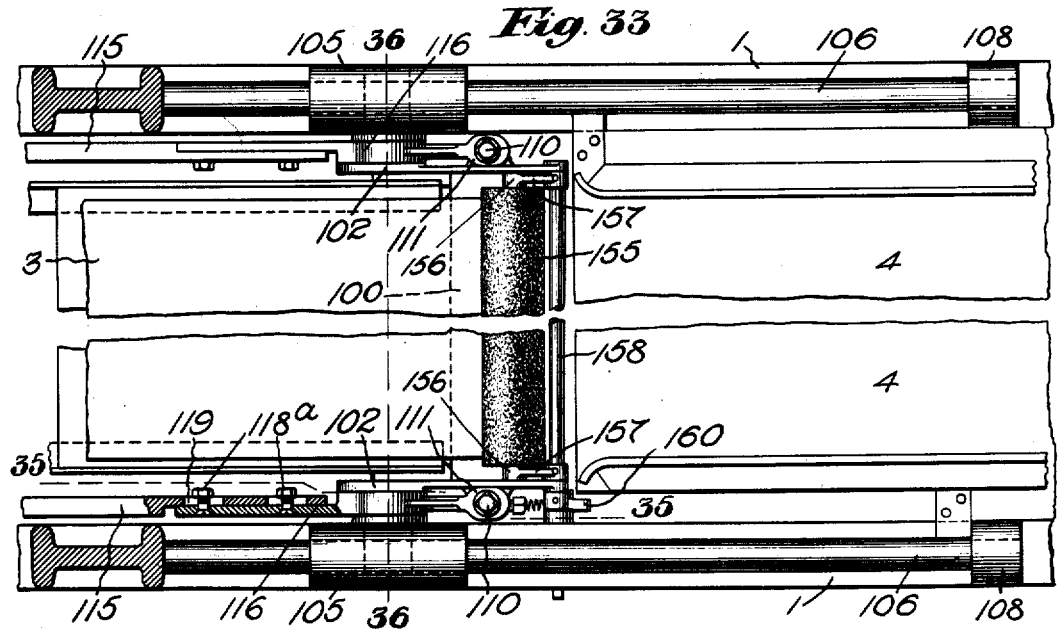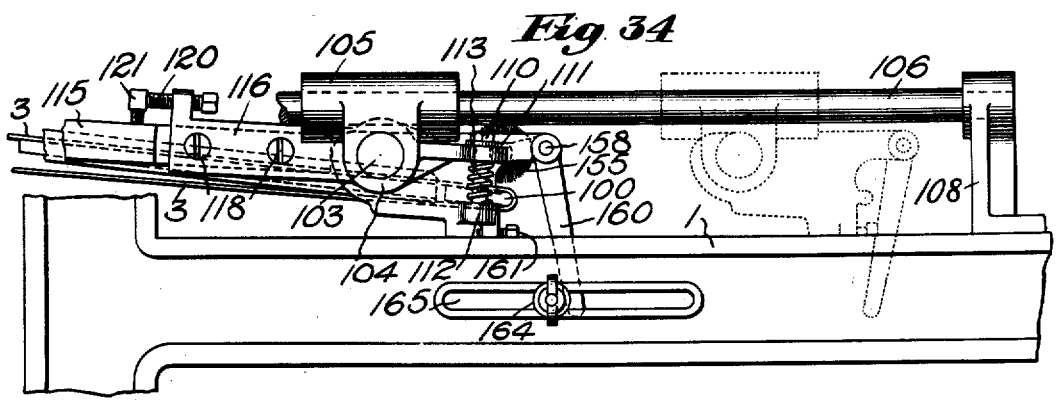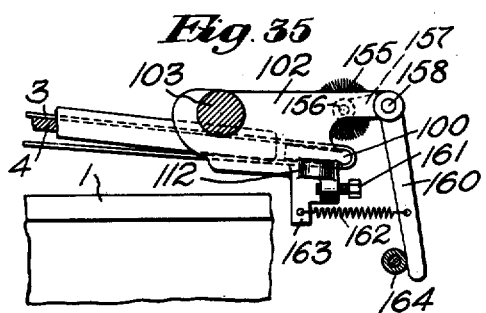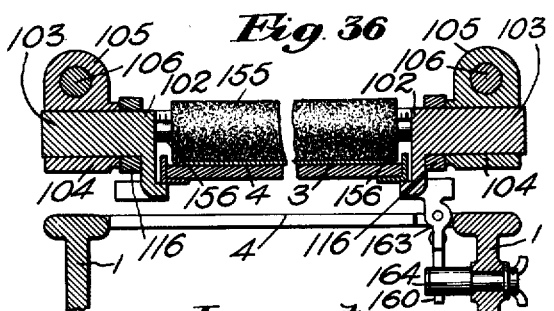

UNITED STATES PATENT OFFICE.

THOMAS L. GREEN, OF INDIANAPOLIS, INDIANA.

BISCUIT-CUTTING MACHINE.

1,180,030.   Specification of Letters Patent.   Patented Apr. 18, 1916.

Application filed February 20, 1909. Serial No. 479,059.

*To all whom it may concern:*

Be it known that I, THOMAS L. GREEN, a citizen of the United States, residing at Indianapolis, county of Marion, State of Indiana, have invented an Improvement in Biscuit-Cutting Machines, of which the following description, in connection with the accompanying drawings, is a specification, like letters on the drawings representing like parts.

My invention relates to machines for cutting biscuits and the like and for manipulating plastic material.

My invention may be readily understood by reference to the following description of an illustrative embodiment thereof shown in the accompanying drawings wherein,—

Figure 1 is a front elevation of part of a convertible panning and peeling machine embodying my invention; Fig. 2 is a similar view of part of the machine forming a continuation of the part shown in Fig. 1; Fig. 3 is an elevation of the end of the machine shown at the left of Fig. 1; Fig. 4 is a diagram showing the line of travel of the feed apron and the pan carrier belt; Fig. 5 is an enlarged elevation of the end of the machine shown at the left of Fig. 1; Fig. 6 is an elevation looking toward the left of Fig. 5; Fig. 7 is a vertical section taken on line 7—7 of Fig. 5; Fig. 8 is an enlarged section of a detail shown in Fig. 5; Fig. 9 is a detail view of a take-up for the apron; Fig. 10 is a plan of Fig. 9; Fig. 11 is a sectional detail taken on line 11—11 of Fig. 9 looking toward the right; Fig. 12 is an enlarged view of a rocking arm for operating parts of the machine; Fig. 13 is a view looking toward the left of Fig. 12; Fig. 14 is an enlarged sectional detail taken on line 14—14 of Fig. 13; Fig. 15 is an enlarged sectional detail taken on line 15—15 of Fig. 12; Fig. 16 is an enlarged view of an arm rocked by the arm shown in Fig. 12; Fig. 17 is a vertical section taken on line 17—17 of Fig. 16; Fig. 18 is a vertical section taken on line 18—18 of Fig. 1; Fig. 19 is a vertical section taken on the dotted line 19—19 of Fig. 3; Fig. 20 is an enlarged detail of parts shown in Fig. 18; Fig. 21 is a section taken on the line 21—21 of Fig. 1; Fig. 22 is a section taken on line 22—22 of Fig. 21; Fig. 23 is an enlarge detail of a gear and shaft connection shown in Fig. 21; Fig. 24 is a section taken on line 24—24 of Fig. 23; Fig. 25 is a plan of portions of the pan belt drive; Fig. 26 is an enlarged view of Fig. 25 looking toward the left; Fig. 27 is a section on the dotted line 27—27 of Fig. 26; Fig. 28 is a front elevation of a surfacing roll; Fig. 29 is a view looking toward the left of Fig. 28; Fig. 30 is a plan of the delivery end of the machine; Fig. 31 is a sectional view taken on the dotted line 31—31 of Fig. 30; Fig. 32 is a sectional view taken on the dotted line 32—32 of Fig. 30; Fig. 33 is an enlarged plan of the delivering end of the machine; Fig. 34 is a side elevation of Fig. 33; Fig. 35 is a sectional detail taken on the dotted line 35—35 of Fig. 33; and, Fig. 36 is a view of Fig. 35 looking toward the left.

In the drawings, referring to Figs. 1, 2, 3 and 4 the machine illustrating my invention, of the type known as a convertible panning and peeling machine, that is, it may be adjusted to deposit died biscuits onto pans or it may be adjusted so that the died biscuits are removed from the apron by the baker's peel.

This machine comprises parallel side frames 1 of considerable length spaced to receive a biscuit carrier herein shown as an apron 3, which travels on the usual supporting boards 4 and guide rollers 5, on and journaled in said side frames. The dough or other plastic material is fed onto said apron in the form of a sheet from the usual dough hopper 6, supported on brackets 7, leading to the dough feeding and gaging rolls 8 and 9 adjustably mounted in the fixed housings 10. A sheet of material of any desired thickness may be obtained by adjusting the rolls 8 and 9 toward and from one another by the usual block and screw adjustment controlled by the hand wheel 11. The said dough feed rolls 8 and 9 may be driven from the main drive shaft 12 by any suitable transmission mechanism, herein and conveniently shown as the well-known Reeves variable speed transmission 13 indicated in outline in Figs. 1 and 3. Said mechanism may be adjusted to furnish various speeds by a hand wheel 14 (Fig. 1) on the front of the machine fixed to a shaft 15 provided at its rear end with a sprocket wheel 16 (Fig. 3) which may be connected by a chain 17 to a sprocket wheel 16ª on the usual Reeves control shaft 16ᵇ. Said rolls are driven from said Reeves mechanism by a train of gears 18, 19, 29, 21 and 21ª (Fig. 3).

The apron at the feeding-in end of the machine (at the left Fig. 1 and right Fig. 3) passes around a feed roller 22 (Figs. 1, 5, 6 and 7) fixed to a shaft 23 mounted in bearings in brackets 24 bolted to the ends of said side frames 1. Hitherto, so far as I am aware, it has been customary to feed said apron by rotating its feed roller by a ratchet or similar mechanism driving the roller from its axis through its shaft. The apron has also been fed by and between two fixed revolving rollers. Such feeds are always accompanied by more or less slip of the apron on said roll or rollers. This is of great disadvantage in manufacturing biscuits and the like where the apron should be fed forward by steps of equal length to the usual reciprocatory cutter, in order to prevent mutilation of the work and to insure the production of the greatest number of biscuits from the dough sheet without unnecessary scrap. My invention aims to overcome such objections by gripping the apron itself to feed it forward in a manner which I will now describe.

Referring more particularly to Figs. 5, 6 and 7, what I term a gripping knife 30 is mounted in an oscillatory knife support 31, parallel to said roll. Said knife is loosely mounted in its support 31 and may be adjusted therein by a set screw 31ª impinging against the back of said knife midway between the ends of the latter, said knife being guided in its support by pins 31ᵇ therein passing through slots 31ᶜ in said knife. This support is provided at its ends with journals 32 which are inserted in bearings in the arms 33, the latter being pivoted about the ends of the feed roller shaft 23 referred to. The blade of the feed knife (see Fig. 7) projects inward toward the periphery of said roll and is turned into engagement with the apron 3 by torsional springs 35 (Fig. 8) which surround the journals 32 of the knife support, one of the ends of said springs being attached to said arms 33, their other ends being secured to the interiors of cups 36 bolted to the ends of said journals 32. When the arms 33 are moved down, the knife 30 will drag ineffectively on said apron 3 without imparting movement thereto. When, however, said arms are moved upward said knife will, by its contact with said apron, be turned toward a truly radial position, limited by its engagement with said apron or finally by the back stop rod 37 and will then nip or grip the said apron between its inner active edge and the feed roller 22 about which said apron and roller will partake of the movement of said knife and be fed thereby. The arms 33 may be conveniently oscillated by connecting rods 40, connected at their upper ends to outwardly projecting ends of said rod 37, and at their lower ends to arms 41 fast on a hollow shaft 42 mounted in bearings on said brackets 24.

This hollow shaft 42 projects beyond one of said side frames to receive an arm 43 actuated by a connecting rod 44, to be hereinafter described.

In feeding the apron by a pawl and ratchet drive, as heretofore, the pawl is oscillated about the ratchet to advance the latter step-by-step, but each time said pawl engages a tooth of said ratchet to feed said apron, more or less movement is lost while said pawl is moving into engagement with one of the teeth of said ratchet resulting in a more sudden starting of the feed than would be the case if the pawl always dropped immediately back of the tooth which it was to drive, a condition impossible to obtain in a pawl and ratchet drive. This objection is overcome by my machine by maintaining the gripping knife constantly in engagement with the feed apron, the entire gradual acceleration of movement of the drive being availed of for gradual starting of the apron with no motion lost in the gripping. This is of importance since any sudden movement of the feed apron will tend to displace the circuits thereon.

To prevent retrograde movement of the feed roller 22 when the knife 30 is being returned for a fresh grip on the apron, a back stop knife 45 (Fig. 7) is mounted in arms 46 which depend from the shaft 23 adjacent the outer sides of the bearings 47 and rest against portions of the brackets 24 or some other suitable stops. This back stop knife 45 is spring-pressed against the apron and against its back stop rod 48 in a manner similar to the feed knife 30. When the roller 22 is being fed forward the back stop knife 45 drags loosely over the apron and away from the back stop rod 48. If the roller 22 tends to rotate in a retrograde direction (Fig. 7), as when the knife 30 is returning for a fresh grip, the back stop knife 45, by virtue of its contact with said apron, will be turned slightly about its axis and against the back stop rod 48 to firmly grip said apron 3 and roller 22 and prevent such retrograde motion. To facilitate the oscillating movements of said arms 33 in advancing the knife 30, counterbalancing springs 50 may be attached at their lower end to the arms 41 and adjustably attached at their upper ends to ears 51 on said brackets 24. Any excess movement or overthrow of the apron 3 when advanced by said gripping device may be prevented by any suitable check, herein shown as comprising a brake pulley 53 (Fig. 6) fixed to an end of the shaft 23, said pulley receiving a brake band 54, one end of which is attached to a stud 56 projecting from the front side frame 1, the opposite end of said band having a rod 57 attached thereto passing through a hole in said stud to receive an adjusting nut 58, the latter being separated from said pin 56 by a suitable expansion spring 59. The usual cutter or die 60 (Fig. 18) is mounted on the usual cutter bar 61, the latter being guided in brackets 62 supported on said side frames. Said cutter bar is reciprocated in the usual manner by connecting rods 63 connecting the same to short cranks 64 on the ends of the cutter shaft 65 below said cutter bar, said shaft being mounted in bearings in said side frame. Said cutter shaft may be driven from said main shaft 12 by the gear 66 fixed thereto and meshing with the gear 67 on said cutter shaft (see Figs. 3 and 18).

In practice the apron 13 occasionally travels more tightly on one side than on the other and it is therefore desirable to support said apron in the position which it naturally assumes, in order that when the cutter die is brought against the sheet of material on the apron the latter will be firmly supported at all points.

I have provided herein a support to meet the above requirements comprising a bed plate 70 (Figs. 18 and 19), which is mounted on a bed 71, supported by bearing blocks 72 hollowed out to rest on eccentrics 73. These eccentrics are fixed and may be rotated by the front and rear longitudinal shafts 74 and 75 which are independently mounted in suitable bearings in a bed base 76, the latter extending between said side frames 1 below said bed plate. The rear shaft 75 may be rotated by a worm wheel 77 fixed thereto, meshing with a worm 78 fixed to a transverse shaft 79 mounted in bearings in said side frames.

The front shaft 74 may be rotated by a worm wheel 80 fixed thereto meshing with a worm 81 fixed to a sleeve 82 loosely mounted on said shaft 79. The shaft 79 and the sleeve 82 project toward the front of the machine and may be independently rotated by adjacent hand wheels 83 and 84 (Fig. 20) fixed to said shaft 79 and sleeve 82, respectively. These hand wheels may be connected to rotate together, by a spring-pressed coupling pin 85 adapted to pass through the rim of said hand wheel 83 into a socket in said hand wheel 84. If it is desired independently to raise or lower the sides of the bed plate 70 the coupling pin 85 may be withdrawn against the resistance of its spring to disconnect the hand wheels 83 and 84, and then one hand wheel or the other may be rotated to give the said bed plate the desired position. The bed 71 is maintained in its central position between the side frames by a center stud 87 (Fig. 19) vertically adjustable in a boss 88 projecting upward from said bed base 76 and having a ball 89 on the upper end thereof projecting into a boss 90 depending from said bed 71.

Referring now more particularly to the delivery end of the machine I will describe means for depositing the died biscuits which are fed forward by the feed apron.

The apron 3, see Figs. 2 and 4 inclines downwardly toward the delivery end of the machine and passes around the edge of what I term a panner blade or guide 100 (Figs. 33, 34 and 35) extending between the side frames of the machine, said blade being supported at its ends by arms 102, having outwardly projecting journals 103, mounted in bosses 104, depending from sleeves 105. The latter are mounted to slide on horizontal guide rods 106, one of the ends of which are secured in said side frames and the opposite ends of which are mounted in brackets 108 also mounted on said frames. The panner blade 100 may be supported and adjusted to the proper distance from the surface to which the biscuits are deposited by bolts 110 (Fig. 34) depending from elongated holes in ears 111 on members 116, the lower ends of said bolts passing through ears 112 on the outer ends of said blade carrying arms 102, said blade 100 being held by said bolts against the resistance of springs 113 interposed between said supporting ears 111 and said ears 112 on said blade. As already stated the apron 3 is given an intermittent or step-by-step forward movement to present the plastic material successively to the vertically reciprocating cutter and to feed the died out biscuits on toward the panner blade 100 from which they are to be deposited onto the desired receiving surface. The latter, however, in the preferred embodiment of my invention, travels continuously and since it is desired to deposit the biscuit upon the receiving surface during the interval when the apron is at rest, I have organized the present machine so that the panner blade is retreated at regular intervals the apron being drawn with it as it retreats so as to shorten the apron surface and deposit therefrom onto the surface beneath such of the died biscuits as move supported next to or over said panner blade. To this end said blade is alternately advanced and retreated by the panner blade rods 115 (Figs. 33 and 34) attached at one of their ends to members 116 fixed to said sleeves and connected at their opposite ends to rocker arms 117 (Fig. 1) on a shaft 118 mounted in bearings in said side frames. It will be understood that said retreating movement is not limited to a reciprocating movement, but that any equivalent movement which would operate to deposit the biscuits from the feed apron, might be used. One end of said panner blade may be adjusted to equalize the tension on the edge portions of the feed apron by adjustably attaching one of said panner blade rods 115 to its sleeve member 116 by suitable bolts 118ᵃ (Fig. 34) passing through slots 119 in the latter. A nicety of adjustment may be effected by setting a screw 120 on said member against a stop 121 on one of said rods.

To rock the panner blade arms 117 (Figs. 16 and 17) they are provided with a rod 122 mounted in bosses in said arms, said rod projecting beyond one of said arms to receive the panner blade connecting rod 123, the opposite end of which is attached to a supplemental panner blade rocking arm 124 on a shaft 125 mounted in bearings near the bottoms of said side frames. The length of apron surface between said cutter and the panner blade guiding the delivery end of the apron will be occupied by successive transverse rows of biscuits. Said length might be calculated exactly to contain a number of rows of biscuits of one size and not to be the proper length to exactly contain an even number of biscuits of a different size. To support an even number of rows with no biscuits overhanging said blade the length of said apron may be conveniently regulated by a turnbuckle 123ᵃ (Fig. 1) interposed in said connecting rod 123 to vary the distance of said panner blade from said cutter. Said supplemental panner blade rocker arm 124 may be actuated in any desired manner. Herein it is conveniently actuated by detachably connecting it to what may be termed the apron grip rocker arm 126 by a pin 127 (Fig. 15) extended through an ear 128 on said arm 126 into said supplemental panner blade rocker arm 124. Said pin is retained in extended and withdrawn positions by a spring pressed latch 129 set in said ear and adapted to engage peripheral grooves 130 and 131 in said pin. Said apron grip rocker arm 126 may be rocked by a depending arm 132 (Fig. 12) on the end of a shaft 133 mounted in bearings near the tops of said side frames. This depending arm and the rocker arm 126 overlap and are adjustably connected to vary the throw of the one by the other by a block 134 (Fig. 15) adjustable in a slot 135 in said depending arm and receiving a bolt 136 passed through a block 137 sliding in a similar slot 138 in said arm 126. This block may be adjusted by a screw shaft 139 controlled by a hand wheel 140, said screw passing through an ear 141 (Fig. 15) on said block and a bearing 142 projecting laterally from said arm adjacent its fulcrum to register with said ear 141. Said screw shaft 139 may be clamped to hold said block 134 in its adjusted positions by a clamping sleeve 143 (Fig. 14) on the upper end of said shaft and having threaded engagement with a counter bore 144 of said bearing 142, said sleeve being adapted to be set up against a flange 145 on said shaft by the sleeve handle 146, thereby to clamp said flange against the base of said counter bore. The depending arm 132 and the arms connected therewith may be rocked by a connecting rod 147 connecting said arm with an eccentric 148 (Figs. 1 and 18) fast on the cutter shaft 65 heretofore referred to. As the panner blade retreats the apron must be shortened and when it advances the apron must be lengthened. To accomplish this I have caused the apron to be carried about a guide roller 150 carried at the upper ends of the panner blade arms 117, then forwardly about a stationary guide roller 151 mounted in the frame. Thus as said roller arms move forward to advance the blade, the apron will be correspondingly and proportionately lengthened and correspondingly as said arms return to carry said blade rearwardly the apron is correspondingly taken up, so at all times the apron is maintained taut, whatever the effective length of apron surface or the position of said blade. As the panner blade in its reciprocation alternately shortens the feed apron supporting surface, a row or rows of biscuits are deposited or delivered therefrom upon the surface beneath. If the rows of biscuits upon the apron are single and parallel, it is only necessary that the blade be withdrawn and the apron shortened by a distance equal to the diameter of the leading row of biscuits, to cause said row to be deposited upon the surface beneath. If two straight rows be cut at each step of the cutter and fed forward, of course the blade will be withdrawn and the apron shortened by a distance equal to the two rows so fed. In each case the advance movement of the blade should equal the feeding movement or next step of the apron in order that the next row or rows of biscuits fed forward by and onto the apron, should be at the edge of the blade when in its forward position. Such an arrangement would be satisfactory where the biscuits are cut out of the dough sheet in parallel rows, but in a large variety of work the biscuits are cut in staggered rows (Fig. 30) to eliminate as much scrap as possible. It will be apparent that to withdraw the panner blade entirely from under one staggered row of biscuits would result in partly withdrawing said blade from under the next following row, and the biscuits of which would thus be left partly overhanging the blade edge and without support. For example, in Fig. 30 the staggered biscuit rows as m, have been deposited and the panner blade is in its extreme position of retreat showing the next succeeding staggered rows, remaining on the apron, the edge row s being partially supported.

The panner blade for best operation should retreat a little beyond the rear edge of the row deposited to prevent any collision with the cakes of that row during their drop from said blade which might occur if the blade started forward as soon as entirely withdrawn from said row. If the panner knife and the apron should now advance evenly together the row *s* would still project partly over and beyond the edge and some if not all of said biscuits might fall off or be fed down under their own weight and be distorted. I have overcome this objection by giving the panner blade a greater forward speed and travel than the feed apron so that by the time the apron has completed its feeding movement the panner blade has outrun it sufficiently to reach the leading edge of the leading row of biscuits to afford this row complete support from beneath. In other words, it is always necessary to withdraw the panner blade and shorten the apron a distance equal to and slightly in excess of the full diameter of a biscuit or biscuits in the row or rows that are to be deposited and consequently to advance said blade and lengthen said apron by an equal distance at each stroke. When the biscuits however are cut in staggered relation, as shown in Fig. 30, by reason of the interlapping of the rows, the apron feed is less than the diameter or aggregated diameters of biscuits in the row or rows cut at each reciprocation of the cutter. Consequently it is necessary that the panner blade at such time have a return or advance movement that exceeds the forward or step feed of the apron to provide a support for said overhanging biscuits immediately after the outer overlapping row is deposited. This excess of travel of the panner blade as compared with the apron feed, is herein accomplished as follows:

It will be apparent that the panner blade arms 117 (Fig. 1) and the apron grip rocking arm 126 being connected by the rod 123 and through the supplementary panner blade arm 124 will be rocked together, but since the length of arm effective to reciprocate the panner blade is greater and herein about twice the length of arm effective to feed the apron, the extent of each forward stroke of the panner blade will be about twice the extent of each step of the apron feed, and in the course of each stroke and step the panner blade will move quickly ahead of the apron because of the greater length of travel of said blade in the same period of time. Thus the leading staggered row of biscuits have partial support only for an instant while the preceding row or rows are being deposited, the panner blade immediately moving forward to fully support said partially supported row without any resultant mutilation, distortion or displacement of the biscuits.

Ordinarily the portion of the biscuits of the staggered row hanging over the end of the apron would not fall off during the short interval while they are partially supported, but to insure said biscuits in said row remaining on said apron I have herein provided a light brush 155 (Figs. 33, 34, 35 and 36) intermittently to rest thereon, said brush having journals 156 mounted in arms 157 fixed to a shaft 158, the ends of which are mounted in bearings in the outer ends of said blade carrying arms 102. Said brush 155 is held normally out of engagement with the biscuits on said apron by an arm 160 depending from and fixed to said shaft 158, said arm being drawn into engagement with an adjustable back stop 161 on one of said arms 102 by a coil spring 162 attached to said arms 160 and a lug 163 on one of said arms 102. When the panner blade retreats said arm 160 will be dragged against an adjustable stop 164 on the frame and will act to turn the brush carrier to depress the brush into sufficient contact with the rear portion of the overhanging biscuits to retain the latter in proper position on said apron.

The usual dust brush 166 (Figs. 1 and 3) may be mounted on the said frames a little in advance of the feed rolls 8 and 9 and said brush is provided herein with journals 167 mounted in bearings in arms 168 fixed to a shaft 169 mounted in bearings in brackets 170 on said side frames. Said brush may be adjusted toward and from the dough carrier by the usual screw adjustment 171. This brush may be driven from a sheave 172 on the driven shaft 173 of said Reeves variable speed transmission mechanism by means of a round belt 174 passing around a sheave 175 adjacent said brush.

Referring to Figs. 1, 28 and 29, a dough polishing or surfacing roll 176 is mounted on said side frames between said dust brush 166 and said cutter 60 and is provided with journals 177 mounted in bearing blocks 178, the latter being supported in guide brackets 179 attached to the top of said side frames. Said roller bearing blocks may be partially supported by springs 180 to relieve somewhat the weight of said roller upon the sheet of dough or other material thereunder thereby to provide the desired light and polishing contact. The downward movement of said roll may be limited by adjusting nuts 181 on said brackets under said bearing blocks 178. The roll 176 may have a smooth periphery or it may be roughened, as for example, it may be given a ratchet tooth surface, as desired, to impart the desired skin or surface to the sheet passing thereunder. Said surfacing roll 176 is preferably driven at a considerable speed in an opposite direction to the travel of the apron by the same transmission belt 174 which drives said dust brush 166, said belt passing over tight and loose sheaves 182 on one of said polishing roll journals 177.

To prevent the died biscuits from moving out of place during the travel of the feed apron the scrap surrounding the biscuits is retained on the apron until the biscuits are adjacent the delivery end thereof and the scrap apron 190 (Fig. 2) therefore is mounted as near the delivery end of said feed apron as possible. Said scrap apron herein is mounted on the usual guide rollers 191, 192 and 193 and arms 194 supported by brackets 195 on said side frames. Said scrap apron is intermittently fed by a connecting rod 196 connected at one end to the usual scrap ratchet feed mechanism not shown and at the other end to said panner blade rocker arms 117 by a stud bolt 197 (Fig. 17), the latter being vertically adjustable in a slot 198 in one end of said arms 117 to vary the feed of said scrap apron.

When the machine is used as a peeler the scrap is removed by hand and the scrap apron is moved up out of the way in the usual manner and the panner blade supplementary rocking arm 124 is disconnected from said apron grip rocking arm 126 by the pin connection 127 described.

When the machine is used as a panner the feed apron passes around the apron grip roller 22 (Fig. 4) under the dough feed rolls 8 and 9, the dust brush 166, the polishing roll 176 and the cutter 60 over the small guide roller 5 around the panner blade 100, returning around the reciprocating roller 150 and the fixed roller 151 under and over small guide rollers 5 and around the guide roller 200 located beneath said apron grip roller 22, said roller 200 being journaled in bearings in the referred to apron grip roller brackets 24. The said apron then passes again toward the delivery end of the machine (Fig. 1), passes around a guide roller 201 and returns toward said apron grip roller 22. Said roller 201 is journaled in blocks 202 (Figs. 9, 10 and 11) mounted in guides 203 supported in brackets depending from said side frames. These blocks may be moved toward and from the feeding-in end of the machine by sprocket chains 204, their ends being attached to hooks 205 on the opposite sides of said blocks. Said chains pass around sprocket wheels 206 fixed to a shaft 207 in bearings in said side frames adjacent one of the ends of said block guides 203, said shaft being controlled by a suitable hand wheel 208. Said sprocket chains also pass around sprocket wheels 209 mounted on a shaft 210 adjacent the opposite ends of said block guides 203. (Fig. 7). By moving the roller 201 along its guides by means of said hand wheel 208 and chains 204, the apron may be tightened or loosened and when the machine is set up as a peeler said roller is moved toward the feeding-in end of the machine to let off an additional length of apron to extend the apron at the delivery end of the machine where it is guided in the usual manner around the usual removable roller, not shown herein.

The biscuits fed forward by said apron may be automatically deposited on any surface desired. Herein the biscuits are deposited by the panner blade on pans fed beneath said panner blade upon or by carrier belts 220 (Figs. 1, 2, 4 and 25) guided on pulleys 221 fixed to a shaft 222 and on pulleys 223 (Fig. 2) fixed to a shaft 224 journaled in blocks 225 which may be moved in guides 226 by suitable screws 227 to tighten said belts. The pans are fed positively with said pan carrier belts 220 by a sprocket chain 230 (Fig. 25) provided with lugs 231 at intervals corresponding to the pan lengths, said chains passing around a sprocket wheel 232 (Fig. 25) fixed to said shaft 222 and also above a sprocket wheel 234 (Fig. 2) mounted centrally on a shaft 235 journaled in bearings in said side frames. Said sprocket chain 230 passes over and may be adjusted by a wheel 236 mounted on a stud shaft 237 in a block 238 supported in an inclined arm 239, this arm being supported at its upper end on said shaft 235 and at its lower end on a shaft 240 journaled in bearings in said side frames. This block 238 may be adjusted in a slot 241 in its supporting arm 239 by a suitable screw 242.

In machines of this class a considerable number and variety of biscuits of various sizes may be died out. It is obvious that if the die is cutting rows of large biscuits it is necessary that the feed apron and the pans should move more rapidly when cutting small biscuits. It is therefore desirable to drive the pan carrier at varying rates of speed. This pan carrier drive mechanism is mounted in a two-part casing 250 (Figs. 1, 21 and 22) located between said side frames, and is driven from a pinion 251 (Fig. 1) fast on said cutter shaft 65, said pinion meshing with a gear 252 fast on a driving shaft 253 journaled in bosses 254 projecting from said casing. These bosses are mounted in brackets 255 attached to uprights 256 on said side frames. A plurality of gears 257 (Fig. 21) of various sizes are fixed to shaft 253 within said casing, said gears meshing with gears 258 of various sizes loosely mounted on a driven shaft 259 (Fig. 21,) journaled in bosses 260 in said casing. Any one of said loose gears 258 may be connected to the shaft 259 to transmit a variety of speeds thereto from said driving shaft 253 in a manner which I will now describe.

The driven shaft 259 is movable longitudinally in its bearings and is provided with a plurality of pockets 265 containing spring-pressed keys 266, 267 and 268, which tend to project from said shaft to engage corresponding key ways in the gears 258 thereon, when said keys and key ways are brought into registration. Said keys 266, 267, and 268 are provided with cam shaped or inclined ends and are spaced such distances that but one of said keys at a time will come into registration with one of said key-ways, the other keys being depressed by the engagement of their respective cam ends with washers 270 on said shaft and interposed between the adjacent gears 258. Said shaft may be moved longitudinally to bring said keys into registration with the various gears 258 in suitable manner as by a hand wheel 271, having its hub 272 interiorly threaded to engage corresponding screw threads on one of the ends of said shaft 259. Axial movement of said hand wheel may be prevented by a flange 273 on the inner end of the hand wheel hub 272, said flange rotating in an annular groove 274 in the boss bearing 260. This hand wheel 271 may be locked to rotate with said shaft 259 by a spring pressed pawl 275 on the hub of said hand wheel adapted to engage a longitudinal groove 276 on said shaft 259. To adjust the shaft 259 longitudinally the pawl 275 will be withdrawn from said shaft and the hand wheel rotated. The latter being held from axial movement and having threaded engagement with said shaft, will move the shaft through said hub to cause one of said keys to connect one of said gears 258 to said shaft. The pawl 275 may then be released to lock said hand wheel and shaft together. The gears on said shaft referred to in general as 258 may be individually designated by the letters a, b, c, d, e, f, g, h, i, j and k.

In Fig. 21 the gear a is shown connected to the shaft 259 by the key 266. If the shaft 259 be moved longitudinally toward the right the inclined end of the key 266 will impinge against one of said washers 270 and will be depressed into its pocket, leaving the gear a loose on said shaft. At the same time the key 267 will have moved out from under one of said washers 270 and, pressed by its spring, will have entered the key-way of gear b, the drive then being transmitted to the shaft 259 through said gear b. If the shaft 259 be moved still farther toward the right the key 266 will remain depressed, the key 267 will be depressed to release the gear b, and the key 268 will project into the key-way of gear c to transmit the drive to the shaft 259 through the latter. If the shaft 259 be moved still farther to the right the keys 267 and 268 will be depressed and the key 266 will move to a position to connect gear d to said shaft 259. In a similar manner, by advancing the shaft 259 toward the right the drive may be transmitted through the various sized gears e, f, g, h, i, j and k.

The pan carrier 220 (Figs. 1 and 4) will move along at a constant speed until a pan is filled with biscuits when said carrier should, for the best results, be given a forward acceleration or skip to bridge or cover the space between the filled pan and the next succeeding pan to be filled to carry the pans quickly past the point where biscuits are being periodically deposited, so as to prevent the biscuits from falling between or on to the edges of adjacent pans and, in addition, to leave selvages adjacent the edges of said pans.

Referring still to Figs. 21 and 22, I will now describe one type of mechanism whereby this forward impulse or skip may be obtained. Some of the teeth on the peripheries of the driven gears 258 are omitted to leave blank spaces 280. When these spaces are brought opposite to the driving gears 257 the connection between said driving and driven gears is broken and said driven gears 258 are then driven momentarily by spiders 281, fixed to said driving shaft 253 adjacent said driving gears. Said spiders are provided with a plurality of fingers 282 which extend beyond the periphery of said driving gears 257 to engage U-shaped followers 283 mounted on the sides of said driven gears, said followers being set in from the peripheries of said driven gears. The driven shaft 259 will be rotated at a uniform speed while the driving and driven gears are in mesh, but when said spider fingers 282 transmit the drive to said driven gears the radial driving ratios are changed momentarily and the driven gear is rotated at a higher speed than when driven by said meshing gears. This higher rate of speed will be approached gradually since the point of impact between a finger on said spider and said U-shaped follower gradually moves toward the outer end of said finger, the highest speed being transmitted when said finger and said U-shaped projection are indirect alinement, the point of driving impact then being at its greatest distance from the center of said driving shaft. This is of importance because the biscuits occupying the pans may be very easily displaced by any sudden movement such as would result if the change in speed were abrupt.

Since the diameters of the driving and driven gears vary it will be necessary to use spiders of various sizes, and it will be apparent that the longer the fingers of the spider the longer will be the period and the higher will be the rate of acceleration transmitted.

Since the followers 283 on the driven gears reach positions opposite to said driving wheel but once in each revolution of the driven wheel, and since the driven gears 258 are larger than the driving gears 257, it will be apparent that the same finger of the spider does not impart a periodic impulse in each successive revolution of the driven wheel, but at times the driving wheel will make a plurality of revolutions and fractions thereof, while said driven gear is making one revolution. The pan carrier shaft 222 may be driven from said skip gear mechanism by a sprocket gear 285 splined to said driven shaft 258 outside of said casing 250. Axial movement of said sprocket gear is prevented by a flange 286 on the hub 287 of said gear, said flange rotating in an annular groove 286ª in one of said bosses 260 on said casing 250. The sprocket gear 285 receives a sprocket chain 288 (Figs. 1 and 25) transmitting rotation to said pan carrier shaft 222, through a sprocket wheel 289 fixed to a sleeve 290 (Fig. 27) on said shaft 222. Said sprocket chain 288 may be tightened by an idler roller 291 on a bracket 292 adjustably attached to the machine frame.

The pitch circle of the sprocket gear 285 substantially equals the length of the pans used and it will be obvious therefore that the skip which occurs at the end of each rotation of such gear will take place just after a filled pan has been fed beneath the blade.

It is desirable to be able to adjust the pan carrier while in motion relatively to the delivery end of the biscuit carrier in order that the lugs on the carrier or the edges of adjacent pans may be in the proper positions appropriately to pass the said delivery end when the periodically accelerated movements of the pan carrier occur.

In order to rotate said shaft 222 independently of its driving mechanism to adjust the positions of the pan carrier and pans relatively to the panner blade, a hand wheel 293 (Figs. 25, 26 and 27) is keyed to the shaft 222 and recessed to contain a gear 294 fast on said sleeve 290. Said hand wheel 293 may be connected to the gear 294 by a spring pressed pawl 295 adapted to engage teeth on the gear. To permit rotation of said shaft 222 independently of its driving mechanism for the purpose of adjusting said pans as aforesaid said pawl 295 may be withdrawn by a suitable handle 296.

In the use of the machine described the dough or plastic material to be worked upon is placed in the hopper 6, from which it is fed in sheet form upon the step-by-step advancing apron 3. This apron advances the sheet of material under the dust brush 166 and polishing roll 176, if the latter or either of them be used, thence on to the vertically reciprocating cutter 60, which in its successive strokes between successive feeds of the apron and the sheet material thereon dies out or forms the biscuits or other articles to be produced by the aid of the machine.

If the cutter be formed to cut out one or more parallel straight transverse rows of biscuits, then the step feeds of the apron will be substantially equal to the diameter of such a biscuit and a multiple thereof and reasonable clearance. If, on the contrary, the cutter is formed to cut a plurality of staggered rows of biscuits the step feed of the apron will in such case be only such as will carry forward the staggered rows that have been cut.

From the cutter the cut biscuits and scrap lying between them are fed on by successive step feeds of the apron toward the delivery end of the apron, the scrap serving to maintain the cut biscuits against displacement or on the apron, such as might otherwise result from the step by step or interrupted travel of the apron.

Preferably, just after the scrap has been lifted or removed by the scrap apron 190, the now free and separated biscuits are fed on to the alternately advancing and retreating end of the apron where the latter passes over and under the panner blade 100. As stated, the movements of this blade are so timed that as each new transverse row or group of rows of biscuits are fed forward to the end of the apron, said blade is similarly fed forward to give support to said biscuits. Immediately, however, upon completion of said such feeding step movement the panner blade retreats to shorten the apron and drop the previously overlying biscuits upon the pan beneath.

Should the row of biscuits be staggered, as described, then the retreating movement of the panner blade will in order to drop the leading biscuits, be required to retreat more or less from under the next succeeding and staggered row, leaving the latter overhanging more or less the edge of the blade in its retreated position and held in place by the retaining brush device 155. The pans which receive the biscuits are fed forward continuously by the carrier therefor, except that as each pan is fed the skip gear mechanism described gives to the pan carrier an added impulse forward to clear the filled pans and bring the next pan into biscuit receiving position.

By my invention there is no possibility of error in the apron feed due to slip as heretofore; since the feeding drive directly engages the apron which must of necessity partake of the full feeding travel of the feeding devices. By my invention also the pans travel continuously, hence the biscuits after deposit therein, are not likely to be piled up and displaced by the dragging motion of a step by step feed when there is nothing to hold the biscuits in proper position but their own weight resting upon the pan bottoms. Moreover the deposit of the biscuits from a reciprocating carrier into a continuously moving carrier is accomplished without in any way injuring the biscuits themselves, the form of the biscuits being perfectly preserved.

The machine has the capacity for wide adjustment to meet many and varying conditions and substantially all of the adjustments may be made while the machine is in motion.

The foregoing and other features of my invention that will be apparent to those skilled in the art, provide a machine that is economical, of ease to operate, has a high speed, producing the most perfect work without unnecessary loss due to waste and imperfect formation and is simple to operate and adjust.

It will be understood that my invention is applicable to machines of the class used for manipulating plastic material; is not limited to the particular biscuit machine herein used as an illustrative embodiment of my invention, and that various modifications in said machine may be made without departing from the spirit of my invention.

Claims:

1. A machine of the class described comprising, in combination, forming means, a carrier for the product formed thereby, and carrier feeding means continuously engaging the carrier and having provision for positive nipping engagement therewith to impart movement thereto.

2. A machine of the class described comprising, in combination, forming means, a carrier for the product formed thereby and intermittently effective carrier feeding means continuously engaging the carrier and constructed and arranged to positively nip said carrier and impart a step-by-step feed thereto.

3. A machine of the class described comprising, in combination, forming means, a carrier for the product formed thereby, guiding means therefor, and carrier nipping means continuously engaging said carrier and coöperating with said guiding means to advance said carrier.

4. A machine of the class described comprising, in combination, forming means, a carrier for the product formed thereby, a guiding roller supporting said carrier and nipping means to feed the latter comprising spring controlled gripping means continuously engaging said carrier, and means to oscillate said gripping means.

5. A machine of the class described comprising, in combination, forming means, a carrier for the product formed thereby, nipping means to advance the latter step by step, and nipping means to prevent retrograde movement of said carrier.

6. In a machine of the class described, the combination of forming means, a movable carrier for the product formed thereby, intermittently effective feeding means to grip said carrier and friction means to prevent overthrow of said carrier.

7. In a biscuit machine, the combination of biscuit forming means, a carrier for the biscuits formed thereby, a guide roller for said carrier, a gripping blade constantly engaging said carrier, and means to move said blade in opposite directions, and having provision for rendering said blade effective to feed said blade when moved in one direction.

8. In a machine of the class described the combination of forming means, a carrier for the product formed by said means, intermittently effective feeding means to grip said carrier and a band brake to prevent overthrow of said carrier.

9. In a biscuit machine the combination of biscuit forming means, a movable carrier for the biscuits formed thereby, rollers for supporting said carrier, intermittent feeding means to grip the latter and means to prevent retrograde movement of said carrier and means to prevent overthrow of said carrier.

10. In a machine of the class described, the combination of forming means, a carrier for the product formed thereby, a guide roller for said carrier and intermittently effective gripping means positively to advance said carrier, comprising a thin edge gripping blade adjacent said roller, blade carrying arms fulcrumed about the axis of the latter and arm oscillating means connected to said arms between said roller and said blade.

11. In a biscuit machine, the combination of biscuit forming means, a carrier for the biscuits formed thereby, a guide roller for said carrier, and gripping means positively to advance said carrier comprising arms pivoted about the axis of said roller, a gripping blade journaled in said arms and a back stop rod between said roller and said blade.

12. In a biscuit machine, the combination of biscuit forming means, a carrier for the biscuits formed thereby, a guide roller for said carrier, and a feed blade adjustable toward and from said roller and means to impart feeding movement to said blade.

13. In a biscuit machine the combination of biscuit forming means, a carrier for the biscuits formed thereby, a guide roller for said carrier, arms fulcrumed about the axis of said roller, a thin edge gripping blade journaled on the outer ends of said arms adapted to engage said carrier between said blade and roller positively to grip and advance said carrier.

14. In a biscuit machine the combination of biscuit forming means, a carrier for the biscuits formed thereby, a guide roller for said carrier, arms mounted to swing about the axis of said roller, a gripping blade fulcrumed in the outer ends of said arms, means to oscillate said arms and counterbalance means connected with the latter.

15. In a biscuit machine, the combination of biscuit forming means, an apron for receiving the biscuits formed thereby, a guide roller for said apron, arms swinging about the axis of said roller, a blade support journaled in the outer ends of said arms, a blade carried by said support and means on said support to adjust the effective edge of said blade toward and from said apron.

16. In a machine of the class described, article forming means, a carrier for feeding a sheet of plastic material thereto, means continuously to advance said carrier step-by-step, and continuously operating, reciprocating means effectively and alternately to shorten and lengthen the supporting surface of said carrier at a delivery point to deliver the articles therefrom as rapidly as they are produced by said forming means.

17. In a machine of the class described, the combination of a carrier for feeding a sheet of plastic material; a reciprocating cutter for forming articles from said sheet and continuously operating, intermittently retreating guiding means for said carrier coöperating therewith to deliver from the latter the articles formed by said cutter.

18. A machine of the class described, comprising in combination, forming means, a carrier for receiving the product formed thereby, means intermittently to advance said carrier, carrier guiding means and means for continuously reciprocating said guiding means to withdraw a portion of the supporting surface of said carrier while the latter is stationary.

19. A biscuit machine comprising, in combination, a die for cutting staggered rows of biscuits, a step by step movable carrier, guiding means for the delivery end of said carrier, and means to reciprocate said guiding means to drop the staggered biscuits adjacent the end of said carrier and having provision immediately to support the overhanging portions of the biscuits in the staggered row remaining on said carrier.

20. In a biscuit machine, the combination of a biscuit cutter, a feeding carrier to deliver the biscuits died out by said cutter, actuating means to reciprocate said guiding means, and adjustable means on said actuating means to set said guiding means a predetermined distance from said cutter.

21. In a biscuit machine, the combination of a biscuit delivering carrier, a panner blade for guiding the delivery end of said carrier, actuating means connected to the ends of said blade to reciprocate the latter, and adjusting means on said actuating means to move one of the ends of said blade forward or backward to equalize the tension on said carrier.

22. In a biscuit machine, the combination of a biscuit delivering carrier, feeding means positively to grip said carrier, guiding means for the delivery end of said carrier, rocking arms, and connecting rods connecting said arms to said gripping means and carrier guiding means respectively simultaneously to feed said carrier and reciprocate said guiding means.

23. In a biscuit machine, the combination of a biscuit delivering carrier, feeding means positively to grip said carrier, guiding means for the delivery end of said carrier, a rocking arm for oscillating said gripping means and an arm of greater length than the latter connected thereto to reciprocate said carrier guiding means simultaneously with said carrier feed but to a greater distance to advance said guiding means more rapidly than said carrier to support the biscuits adjacent the end of said carrier.

24. In a biscuit machine, the combination of a biscuit delivering carrier, feeding means positively to grip said carrier, guiding means for the delivery end of said carrier, an oscillating arm for operating said gripping means to feed said carrier step by step, means connected to said oscillating means to reciprocate said carrier guiding means, and means to vary the extent of said oscillation to vary the length of the carrier feed step and the extent of the reciprocation of said guiding means.

25. In a machine of the class described, the combination of a biscuit cutter, a carrier for feeding a sheet of plastic material thereto, continuously reciprocating, guiding means for said carrier, and carrier take-up and let-off means coöperating therewith.

26. In a biscuit machine, the combination of a frame, an apron, a guiding blade therefor, blade reciprocating rocking arms, an apron guide roller on said arms and a roller on said frame, said rollers coöperating to take up the slack in said apron as said blade reciprocates.

27. In a machine of the class described, the combination of means for forming articles, a sheet-like apron for receiving the articles produced by said forming means, means continuously to advance said apron step by step, and a continuously movable receiving carrier traveling in the same direction as said apron, the latter having provision for directly delivering articles to said continuously movable carrier, said carrier and apron being arranged to support the articles on their upper surfaces during the delivery operation.

28. In a machine of the class described, the combination of forming means with an intermittently movable carrier for receiving the product formed thereby, a continuously movable carrier for directly receiving said product from said intermittently movable carrier, and means alternately to shorten an end portion of said intermittently movable carrier to deliver articles therefrom.

29. In a machine of the class described, the combination with a continuously movable pan-carrier, of driving means therefor including a series of different sized gears, a shaft for said gears, means coöperating with said gears to periodically accelerate said carrier, and manually actuated means for setting the carrier relatively forward or backward while said carrier is in motion.

30. In a biscuit machine, the combination with biscuit-forming means, of a continuously movable pan-carrier, and driving means to periodically accelerate the latter including a driving gear and a driven mutilated gear, and a tooth for and of longer radius than the former for imparting an accelerated movement to the latter.

31. In a machine of the class described, the combination of a pan carrier and driving means therefor, a series of gears, a shaft supporting the latter, spring-pressed keys in said shaft, washers between said gears, and a hand wheel nut to move said shaft longitudinally to connect and disconnect said keys with said gears.

32. In a machine of the class described, the combination of a pan carrier belt, supporting drums therefor, shafts for supporting said drums, a sleeve mounted on one of said shafts, a driving gear fixed to said sleeve, a second gear fixed to said sleeve, a hand wheel fixed to said shaft, and means to connect and disconnect said second gear to said hand wheel to transmit the drive to said shaft.

33. In a machine of the class described, the combination of a cutter, a carrier for feeding a sheet of plastic material thereto, a bed plate supporting said carrier in its passage beneath said cutter, and eccentric means independently to adjust the sides of said bed plate.

34. In a machine of the class described, the combination of a reciprocating cutter, a carrier for feeding plastic material thereto, a bed plate supporting the latter during its travel under said cutter, and eccentric means adjustable to raise or lower the sides of said bed plate independently.

35. In a biscuit machine, the combination of a reciprocating cutter, a movable carrier for delivering a dough sheet thereto, a bed plate supporting said carrier during its travel under said cutter, bearing blocks supporting said bed plate, eccentrics rotatable in said bearing blocks, shafts for supporting said eccentrics, worm wheels on said eccentric shafts, a shaft transverse to said eccentric shafts, a worm on said transverse shaft for rotating one of said worm wheels, a sleeve on said transverse shaft, and a worm thereon for rotating said other worm wheel thereby independently to adjust the sides of said bed plate.

36. In a biscuit machine, the combination of a reciprocating cutter, a carrier for delivering a dough sheet thereto, a bed plate for supporting said carrier during its travel under said cutter, eccentrics for supporting said bed plate, shafts carrying said eccentrics, and hand wheels independently to actuate said shafts to tilt said bed plate.

37. In a biscuit machine, the combination of a carrier for feeding a sheet of dough, and a ratchet toothed polishing roll mounted adjacent the said carrier to give said sheet a smooth surface.

38. In a biscuit machine, the combination of a frame, a carrier for feeding a sheet of dough, a roll mounted on said frame adjacent said carrier for continuous engagement with said sheet, and means to drive said roll in the opposite direction to the travel of said sheet to give the latter a surface skin.

39. In a biscuit machine, the combination of a frame, a carrier thereon for feeding a sheet of dough, a polishing roll mounted on said frame above said carrier for continuous engagement with said sheet for imparting a surface to said sheet, and means partially to support said roll upon said sheet.

40. A pan carrier consisting of an endless conveyer, a pan skipping mechanism coöperating with said conveyer and means for setting said conveyer relatively forward or backward while in motion for the purpose of registering the pans with the pan skip.

41. A pan carrier consisting of an endless conveyer, a pan skipping mechanism arranged to actuate said conveyer at certain intervals, means for driving said conveyer and manually operated means for accelerating or retarding the movement of said conveyer for the purpose of registering the pans with the pan skip.

42. The combination with a pan-carrier of means for automatically periodically accelerating the movement of said carrier, and manually actuated means for setting the carrier relatively forward or backward while said carrier is in motion.

43. The combination with a pan-carrier having elements for engagement with pans, of means to feed said carrier continuously, means for automatically periodically accelerating the movement of said carrier and manually operable means to adjust said carrier while in motion relatively forward or backward to cause said elements to receive the accelerated movement in diffused positions.

44. The combination with a pan-carrier of means for periodically accelerating the movement of said carrier, and means including a hand-wheel operable while the machine is in motion for accelerating or retarding the movement of said carrier.

45. The combination with a biscuit carrier 3 having a delivery end, of feeding means for said carrier, a carrier 220 for pans adapted to receive biscuits from said biscuit carrier, means to feed said pan carrier continuously, means for automatically periodically accelerating the movement of said pan carrier to prevent biscuits from being deposited on the edges of adjacent pans, and manually operable means 293 to adjust said pan carrier while in motion relatively to the delivery end of said biscuit carrier to vary the relation of the accelerated movement thereto.

In testimony whereof, I have signed my name to this specification, in the presence of two subscribing witnesses.

THOMAS L. GREEN.

Witnesses:
FREDERICK L. EMERY,
WM. A. OREN.

It is hereby certified that in Letters Patent No. 1,180,030, granted April 18, 1916, upon the application of Thomas L. Green, of Indianapolis, Indiana, for an improvement in "Biscuit-Cutting Machines," errors appear in the printed specification requiring correction as follows: Page 2, line 21, for the word "inventiton" read *invention;* same page, line 91, for the word "circuits" read *biscuits;* line 117, for the word "end" read *ends;* page 3, line 11, for the word "frame" read *frames;* same page, line 16, for the reference-numeral "13" read *3;* line 29, after the word "fixed" insert the word *on;* line 104, for the word "biscuit" read *biscuits;* page 4, lines 24-25, for the word "convenientiy" read *conveniently;* line 122, strike out the word "as"; page 5, line 81, for the word "arms" read *arm;* page 6, line 83, for the word "chains" read *chain;* same page, line 102, after the word "rapidly" insert the word *than;* page 7, line 110, for the word "indirect" read *in direct;* page 11, line 128, claim 43, for the word "diffused" read *different;* and that the said Letters Patent should be read with these corrections therein that the same may conform to the record of the case in the Patent Office.

Signed and sealed this 23d day of May, A. D., 1916.

[SEAL.]

J. T. NEWTON,
*Acting Commissioner of Patents.*

Cl. 107—6.